US012808405B2

(12) United States Patent
Harich

(10) Patent No.: US 12,808,405 B2
(45) **Date of Patent: *Nov. 24, 2026**

(54) BEARING ARRANGEMENT FOR A ROTATING COMPONENT OF A WIND TURBINE

(71) Applicant: Nordex Energy SE & Co. KG, Hamburg (DE)

(72) Inventor: Martin Harich, Tornesch (DE)

(73) Assignee: Nordex Energy SE & Co. KG, Hamburg (DE)

( * ) Notice: Subject to any disclaimer, the term of this patent is extended or adjusted under 35 U.S.C. 154(b) by 83 days.

This patent is subject to a terminal disclaimer.

(21) Appl. No.: 18/732,228

(22) Filed: Jun. 3, 2024

(65) Prior Publication Data

US 2024/0410419 A1 Dec. 12, 2024

(30) Foreign Application Priority Data

Jun. 9, 2023 (EP) .................................... 23178382

(51) Int. Cl.
*F16C 25/06* (2006.01)

(52) U.S. Cl.
CPC .......... *F16C 25/06* (2013.01); *F16C 2233/00* (2013.01); *F16C 2360/31* (2013.01)

(58) Field of Classification Search
CPC ............................ F16C 25/06; F16C 2233/00
See application file for complete search history.

(56) References Cited

U.S. PATENT DOCUMENTS 4,571,097 A * 2/1986 Lee ....................... F16C 19/364 384/469
12,066,059 B2 * 8/2024 Marunaka ............ F16C 43/065

FOREIGN PATENT DOCUMENTS

DE 102013226552 B3 * 5/2015 ........... B25B 27/064
DE 10 2017 125 550 A1 5/2019
DE 10 2020 133 993 A1 6/2022
EP 2 290 250 A2 3/2011
EP 2 801 729 A2 11/2014
EP 2 710 271 B1 12/2014
(Continued)

OTHER PUBLICATIONS

Extended European Search Report of the European Patent Office dated Nov. 3, 2023 of European application No. 23178382.0 on which this application is based.

*Primary Examiner* — James Pilkington
(74) *Attorney, Agent, or Firm* — Walter Ottesen, P.A.

(57) ABSTRACT

A bearing arrangement for a rotating component of a wind turbine includes two roller bearings. The rotating component is supported by the second roller bearings and a bearing housing. The roller bearings, the rotating component and the bearing housing are arranged to form a pretension circuit. The first roller bearing includes a first bearing inner ring, a first bearing outer ring and rolling elements. The first bearing outer ring is axially moveable along the rotational axis with respect to the bearing housing and/or radially deformable with respect to the rotational axis. An adjustment device extends through a through-hole of the bearing housing and is accessible from outside the bearing housing. Upon actuation, the adjustment device causes an axial movement and/or a radial deformation of the first bearing outer ring to adjust the pretension of the bearing arrangement.

20 Claims, 6 Drawing Sheets

(56) References Cited

FOREIGN PATENT DOCUMENTS

| | | | |
|---|---|---|---|
| EP | 2 999 894 | B1 | 2/2018 |
| EP | 3 842 650 | A1 | 6/2021 |
| JP | 2006-177268 | A | 7/2006 |
| WO | 2019/156720 | A1 | 8/2019 |
| WO | 2023/045294 | A1 | 3/2023 |

* cited by examiner

BEARING ARRANGEMENT FOR A ROTATING COMPONENT OF A WIND TURBINE

CROSS-REFERENCE TO RELATED APPLICATIONS

This application claims priority of European patent application no. 23178382.0, filed Jun. 9, 2023, the entire content of which is incorporated herein by reference.

TECHNICAL FIELD

The disclosure relates to a bearing arrangement for a rotating component of a wind turbine.

BACKGROUND

Wind turbines with wind turbine rotor blades (hereinafter also referred to as rotor blades) are well known in the prior art and are used to generate energy and are used to convert wind energy into electrical energy.

In wind turbines, there are direct drive concepts in which the rotational motion of the rotor hub is transmitted directly and immediately to a rotating shaft of a generator. Alternatively, there are drive train concepts in which a gearbox is connected between the rotor hub and the generator, wherein the gearbox is connected to the rotor hub via a rotor shaft.

A technical challenge for wind turbines of this type, which are configured for a power range of several megawatts of electrical power, for example, is the provision of a bearing arrangement that meets high technical requirements, such as high bending stiffness, a clearance-free bearing arrangement, low-wear kinematics and the simplest possible assembly combined with high cost-efficiency.

It is known to use roller bearings, for example, tapered roller bearings, to support rotating components of wind turbines, like the rotor shaft. Some roller bearings such as tapered roller bearings are configured to work in pairs. These tapered roller bearings are pretensioned, which means that even with no external load they have a minimum load to allow all rolling elements of the roller bearings to interact with the raceways. This is advantageous in terms of load distribution and contributes to an improved lifetime. This pretension should be kept within narrow limits so that, on the one hand, the positive effect of all rolling elements being in contact with the raceways is ensured and, on the other hand, the roller bearings are not overloaded.

SUMMARY

It is an object of the disclosure to develop a concept for a bearing arrangement to support a rotating element of a wind turbine, which contributes to an efficient adjustment of the level of pretension.

This object is solved by a bearing arrangement for a rotating component of a wind turbine. The bearing arrangement includes: a first roller bearing and a second roller bearing; the rotating component defining a rotational axis and being supported by the first roller bearing and the second roller bearing; a bearing housing defining a through-hole and supporting the first roller bearing and the second roller bearing; the first roller bearing, the second roller bearing, the rotating component and the bearing housing being arranged to form a pretension circuit; the first roller bearing including a first bearing inner ring, a first bearing outer ring and rolling elements arranged between the first bearing inner ring and the first bearing outer ring; the first bearing outer ring being axially moveable along the rotational axis with respect to the bearing housing and/or radially deformable with respect to the rotational axis; an adjustment device extending through the through-hole of the bearing housing; the adjustment device being accessible from outside the bearing housing; and, the adjustment device, upon actuation, being configured to cause at least one of the following: i) an axial movement of the first bearing outer ring; and, ii) a radial deformation of the first bearing outer ring to adjust a pretension of the bearing arrangement.

A bearing arrangement is disclosed, in particular a rotor bearing arrangement, for a rotating component of a wind turbine, in particular for a rotor shaft. The bearing arrangement includes a first roller bearing and a second roller bearing. The bearing arrangement includes the rotating component having a rotational axis, wherein the rotating component is supported by the first roller bearing and the second roller bearing. A bearing housing is provided to support the first roller bearing and the second roller bearing. The first roller bearing, the second roller bearing, the rotating component and the bearing housing are arranged to form a pretension circuit. The first roller bearing includes a first bearing inner ring, a first bearing outer ring and rolling elements arranged between the first bearing inner ring and the first bearing outer ring. The first bearing outer ring is axially moveable along the rotational axis with respect to the bearing housing and/or radially deformable with respect to the rotational axis. An adjustment device is provided, which extends through a through-hole of the bearing housing and is accessible from outside the bearing housing, wherein upon actuation the adjustment device causes an axial movement and/or a radial deformation of the first bearing outer ring to adjust the pretension of the bearing arrangement.

According to the disclosure, a pretensioning mechanism is provided, which enables the outer ring of one bearing to be moved while the inner rings of both bearings and the other outer ring of the other bearing are fixed. As indicated above, a predetermined pretension of the bearing arrangement is necessary as indicated above and is initially set, for example, during assembly or installation in the field. For example, a mean value of pretension is used as a reference value. For different reasons, an adjustment of the pretension can be necessary, for example due to wear. Therefore, it is necessary and advantageous to control and adjust the level of pretension, not only during the production/mounting, but even during operation/maintenance. The invention provides an easy adjustment of the pretension, not only during assembly of the bearing arrangement, but in particular during operation/maintenance of an installed wind turbine in order to set a desired level of pretension. For this purpose, the adjustment device is actuated, whereby a force is transferred onto the first bearing outer ring for its movement. For example, if a deviation from the predetermined pretension is detected, it can be easily corrected via the adjustment device. In particular, the disclosure enables that the actuation of the adjustment device does not involve any contact/access to rotating parts of the drive train. Thus, the actuation can be performed by a technician even during operation of the wind turbine (that is, wind turbine does not need to be stopped to comply with health and safety requirements).

The inventive bearing arrangement has several advantages, for example:

- The adjustment device is accessible from outside the bearing housing without having to dismantle/detach sub-assemblies, for example, the gearbox. In other words, the arrangement of the adjustment device enables the adjustment of the pretension without accessing the bearing arrangement from the gearbox side, more specifically the inner ring at the gearbox side. Free access to the adjustment device is provided. This is particularly advantageous for drive train concepts in which the bearing housing, in particular the rotor bearing housing, is connected to or arranged close to the gearbox when the gearbox is in an installed state, such that little/no space is available for accessing the inner ring at the gearbox side.

The described bearing arrangement contributes to a comparatively less expensive, quick, easy, and time-efficient solution. Particularly, an adjustment of the pretension, even during operation of the wind turbine, can be carried out using simple tools like a wrench/spanner to actuate the adjustment device, for example, by maintenance personnel. Alternatively, such adjustments can be carried out using an automatic tool upon receiving a corresponding actuation signal, for example, based on pretension measurements of one or more respective sensors (see below). Such adjustments can be easily carried out, for example, on a regular basis or depending on pretension measurements. For example, one or more sensors (see further embodiment below) can be provided for measuring the pretension of the bearing arrangement and an adjustment of the pretension can be carried out based thereon. In particular with respect to adjustments carried out during maintenance, the idle time of the wind turbine can be significantly reduced.

In the case that several adjustment devices are provided, the number of adjustment devices is customizable, for example, depending on load level.

The first roller bearing and the second roller bearing can be distant from one another in the axial direction. The first roller bearing is preferably the rear bearing, meaning that the first roller bearing is arranged at a gear box side, facing the gear box of the wind turbine. The second bearing includes a second bearing inner ring, a second bearing outer ring, and rolling elements therebetween. The second roller bearing is preferably facing the rotor side.

With regard to the introductory explanation, the pretension circuit means that the two roller bearings, for example, tapered roller bearings, the rotating component and the bearing housing are formed and configured such that these elements are pretensioned against each other.

The bearing housing is the outer housing, being arranged facing the outside of the bearing arrangement. In other words, the bearing housing is arranged away from the rotational axis.

A through-hole is a hole going through an entire wall of the bearing housing, in contrast to a blind hole. The through-hole can be (partially) threaded, for example, in the case that the adjustment device is a screw, or can be non-threaded in the case that the adjustment device is a bolt or hydraulic cylinder (see further details below).

The first bearing outer ring is axially moveable along the rotational axis, which means along a direction parallel to the rotational axis. Alternatively or additionally, the first bearing outer ring is deformed in a radial direction with respect to the rotational axis. In any case, the movement or deformation is caused by actuation of the adjustment device, wherein a mechanical force is transferred onto the first bearing outer ring, either directly or indirectly.

The adjustment device is a moveable element or includes a moveable element. Due to (linear) movement of the adjustment device or the moveable element, the force is transferred to the first bearing outer ring. Where a movement of the adjustment device is referred to herein, this is a movement of the moveable element corresponding to or included in the adjustment device.

Instead of one adjustment device, several adjustment devices can be provided, for example, arranged along the circumference of the first bearing outer ring.

According to an embodiment, the adjustment device is located between the first roller bearing and the second roller bearing. This contributes to the above-mentioned advantages, in particular the adjustment device can be easily accessed from outside the bearing housing and it is not necessary to access the adjustment device from the gear box side.

According to an embodiment, the adjustment device is configured to move at an angle from 0° to 135° with respect to the rotational axis, in particular at an angle from 0° to 90° with respect to the rotational axis, more particularly at an angle of 0° or 90° with respect to the rotational axis.

The range up to 135° is particularly advantageous in the case that a further component, in particular the gearbox, is arranged directly at or adjacent to the disclosed bearing arrangement. This range ensures that sufficient space is available to arrange the adjustment device and to operate it, for example, by a human worker. For example, with respect to an angle between 90° and 135°, an increase of pretension would then be achieved by moving the adjustment device in an outward direction (instead of moving it towards the first bearing outer ring). A range of 0° to 90° is a preferred option, wherein an angle of 0° or 90° corresponds to a particularly preferred embodiment compared to an inclined angle (for example, 45°), since an axial (0°) or radial (90°) movement of the adjustment device causes an axial movement or radial deformation of the first bearing outer ring. Thus, the configuration and manufacturing process of the bearing arrangement is easier since an inclined angle involves a more complex geometry and configuration and thus a more complex manufacturing process. Generally, although an angle of 0° or 90° with respect to the rotational axis is preferable, an inclined angle is also possible.

According to an embodiment, a force transfer element is provided between the adjustment device and the first bearing outer ring, such that a force, which is generated by actuation of the adjustment device, can be transferred from the adjustment device to the first bearing outer ring. By the force transfer element, a force from the adjustment device is transferred indirectly to the first bearing outer ring. For example, by providing the force transfer element, the force generated by the adjustment device can be spread evenly, or more evenly, by the force transfer element to the first bearing outer ring. This is particularly advantageous since the adjustment device, for example, formed as a screw or a bolt, transmits the force punctually.

According to an embodiment, the adjustment device is configured to move along a predefined moving direction, wherein the adjustment device and the force transfer element together include a contact interface which is inclined with regard to the predefined moving direction. The inclined contact surface serves the purpose of diverting the direction of the force in another direction via the oblique interface. In other words, the adjustment device and the force transfer element interact together in a form-fit manner to redirect a force of the adjustment device. For example, the adjustment device and the force transfer element have a wedge-shaped surface (interface) at their common interface. Thus, the force can be redirected during transmission. For example, a radial movement of the adjustment device is converted into axial movement of the bearing outer ring.

According to an embodiment, the adjustment device is configured to move along a predefined moving direction, wherein a further force transfer element is provided between the force transfer element and the first bearing outer ring, wherein the force transfer element and the further force transfer element together form a contact interface which is inclined with regard to the predefined moving direction. In other words, the force transfer element and the further force transfer element interact together in a form-fit manner to redirect a force of the adjustment device. Essentially, the above-said similarly applies. For example, an axial movement of the force transfer element is converted into radial movement of the further force transfer element, which exemplarily leads to radial deformation of the bearing outer ring.

Generally, by providing an inclined contact interface with one or two force transfer elements, mechanical/constructional flexibility is achieved, in particular with regard to the arrangement of the adjustment device with respect to the first bearing outer ring, and the moving direction of the adjustment device is achieved.

According to an embodiment, the force transfer element and/or the further force transfer element, is a ring-shaped element surrounding the rotational axis, in particular a pressure ring or washer. This contributes to the above functions and advantages. In particular, such force transfer element(s) can spread the force more evenly to the first bearing outer ring.

According to an embodiment, the force transfer element and/or the further force transfer element is formed in segments. This embodiment contributes to a good handling of the force transfer element and/or the further force transfer element. Further, undesired deformations are avoided or reduced compared to one-piece rings of large diameter, which may lead to deformations due to their own weight.

According to an embodiment, a further adjustment device is provided, wherein the further adjustment device, upon actuation, causes an axial movement and/or a radial deformation of the first bearing inner ring to adjust the pretension of the bearing arrangement. This is particularly advantageous if the first bearing inner ring is axially moveable. Thus, a combination of adjustments is provided, wherein the first bearing inner ring and the first bearing outer ring can be adjusted on an individual basis. Thus, a very accurate adjustment of the pretension of the bearing arrangement can be achieved. Furthermore, the adjustment may selectively be carried out via the adjustment device or via a further adjustment device, depending on the circumstances. For example, the adjustment may be carried out via the adjustment device during operation/maintenance of the installed wind turbine, in particular when the gearbox is in an installation state. For example, the adjustment may be carried out via the further adjustment device during production and/or assembly of the bearing arrangement, in particular when the gearbox is not in an installation state.

According to an embodiment, the adjustment device is a screw, a bolt or a hydraulic cylinder. For example, with regard to a screw, the pretension of the bearing arrangement can be easily and precisely carried out. In particular, a defined turn angle of the screw can be easily obtained. Via a hydraulic cylinder, typically high forces can be set up very exactly, thus providing for a precise adjustment of the pretension of the bearing arrangement.

In a further embodiment, the adjustment device is a grub screw, which has no screw head and thus takes up less installation space. Thus, for example, far-reaching structural measures on the bearing housing can be dispensed with.

According to an embodiment, a recess is formed on an outer side of the bearing housing. In the recess the adjustment device is at least partially arranged for mounting and/or actuating the adjustment device. Thus, the adjustment device is easily or comparatively better accessible. For example, access is facilitated via the recess for a tool to actuate the adjustment device, for example, a screw driver, a ring wrench, a machine or the like to provide torque on the adjustment device.

According to an embodiment, the adjustment device is a screw, wherein the recess has a shape which is adapted to the contour of the adjustment screw so that the adjustment screw is embedded in the recess such that turning of the adjustment screw is geometrically limited. In particular, the movement, for example, turning, of a tool is geometrically limited. The geometric limitation enables a defined rotation of the screw, for example, a defined rotation angle, with the tool. Thus, a defined rotation of the screw (for example, 20°) is achieved, that is, a defined movement (turn) of the screw. This leads at least to a defined displacement of the first bearing outer ring (optionally to a defined displacement of a force transfer element) and results in a defined preload path, for example, 0.02 mm. Thus, a precise and controlled setting/readjustment of the preload of the bearing arrangement is possible. For example, the recess is an annular gap. For example, the screw is embedded in the recess of the bearing housing such that the screw is flush with the outside of the bearing housing. For example, the screw is embedded in the bearing housing in such a way that the screw head is inside the contour of the bearing housing and is only reachable via a small, radially orientated opening. This opening automatically limits the turn angle of the screw for a tool. Another advantage is that the flange to accommodate the threads can be configured smaller with less additional material.

According to an embodiment, the adjustment device is a screw, wherein an abutment element is provided at the bearing housing in the region of the adjustment screw or at the adjustment screw itself, so that turning of the adjustment screw is geometrically limited. By the turning of the screw, the screw abuts against the abutment element or with the abutment element. Thus, a precise adjustment of the pretension is possible.

According to an embodiment, the adjustment device includes a sensor for measuring a parameter representative for a pretensioning state of the bearing arrangement, wherein in particular the sensor is configured as a strain gauge. For example, in the case of an adjustment screw, the sensor is arranged at or within the screw, for example, at or within the screw shaft. Via the sensor, an adjustment of the pretension can be based on a deviation of a current pretension value detected by the sensor.

According to an embodiment, the adjustment device (for example, a screw) and/or the force transfer element and/or the bearing housing has a marking for a specific angle of rotation. Thus, actuating the adjustment device, for example, turning the screw, can be done precisely with the help of the marking to indicate a correct position of the adjustment device and thus a correct pretension.

According to an embodiment, a plurality of adjustment devices is provided relative to the circumference of the first bearing outer ring. Thus, the bearing pretension is adjusted by actuating the plurality of adjustment devices. For example, to increase the pretension by a defined amount each adjustment device, for example, each screw, must be tensioned by a certain amount (turn angle), which can be determined beforehand or during the adjustment process, for example, by controlling the values of one or more sensors as described above.

BRIEF DESCRIPTION OF DRAWINGS

The invention will now be described with reference to the drawings wherein.

DETAILED DESCRIPTION

Figure 1:
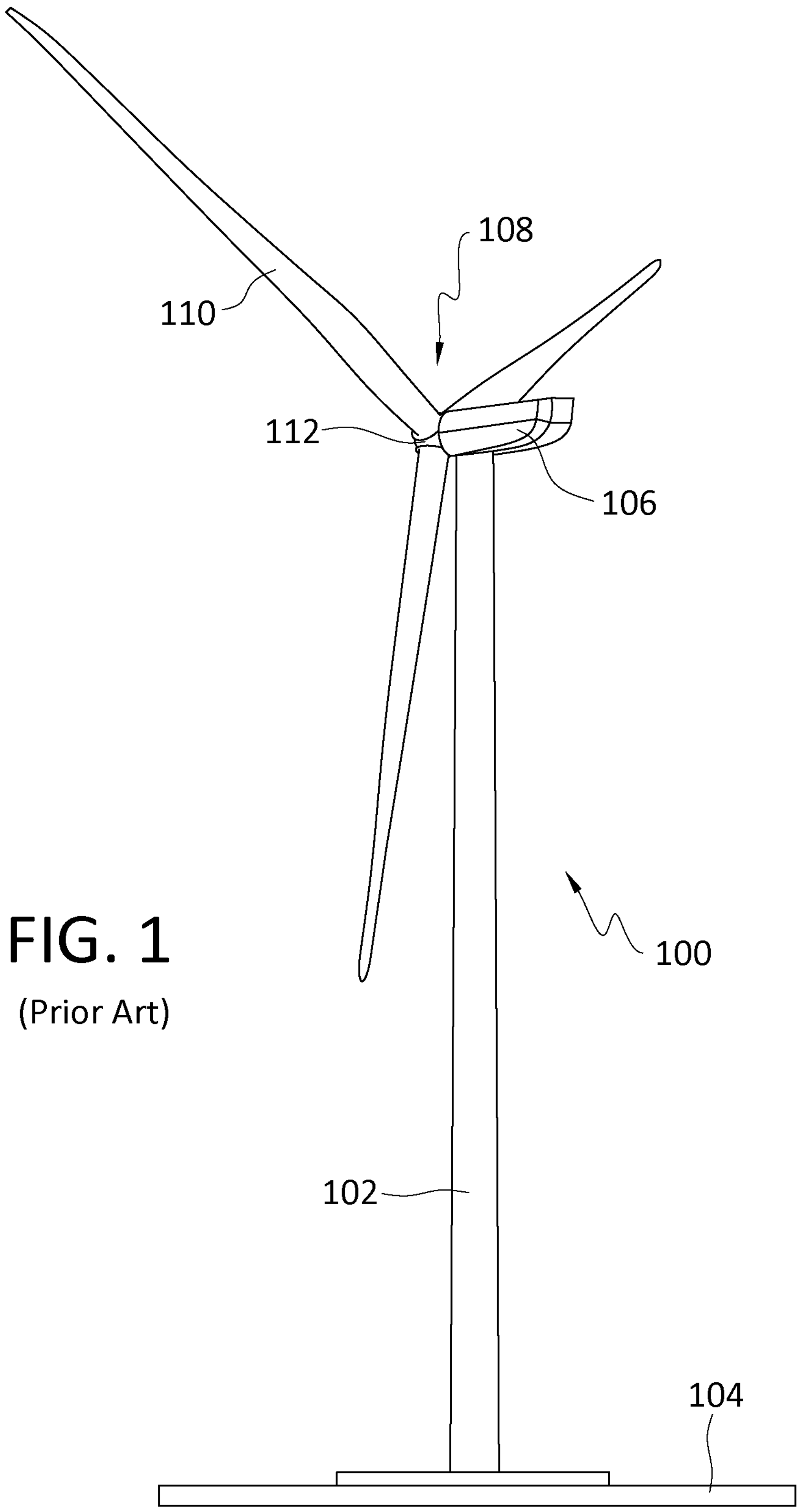
FIG. 1 (Prior Art)
FIG. 1 shows a schematic illustration of a wind turbine.

FIG. 1 shows a schematic view of a wind turbine 100, which includes a tower 102. The tower 102 is fixed to the ground via a foundation 104. At one end of the tower 102 opposite to the ground a nacelle 106 is rotatably mounted. The nacelle 106, for example, includes a generator which is coupled to a rotor 108 via a rotor shaft (not shown). The rotor 108 includes one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the kinetic energy of the rotor 108 into electrical energy.

Figure 2:
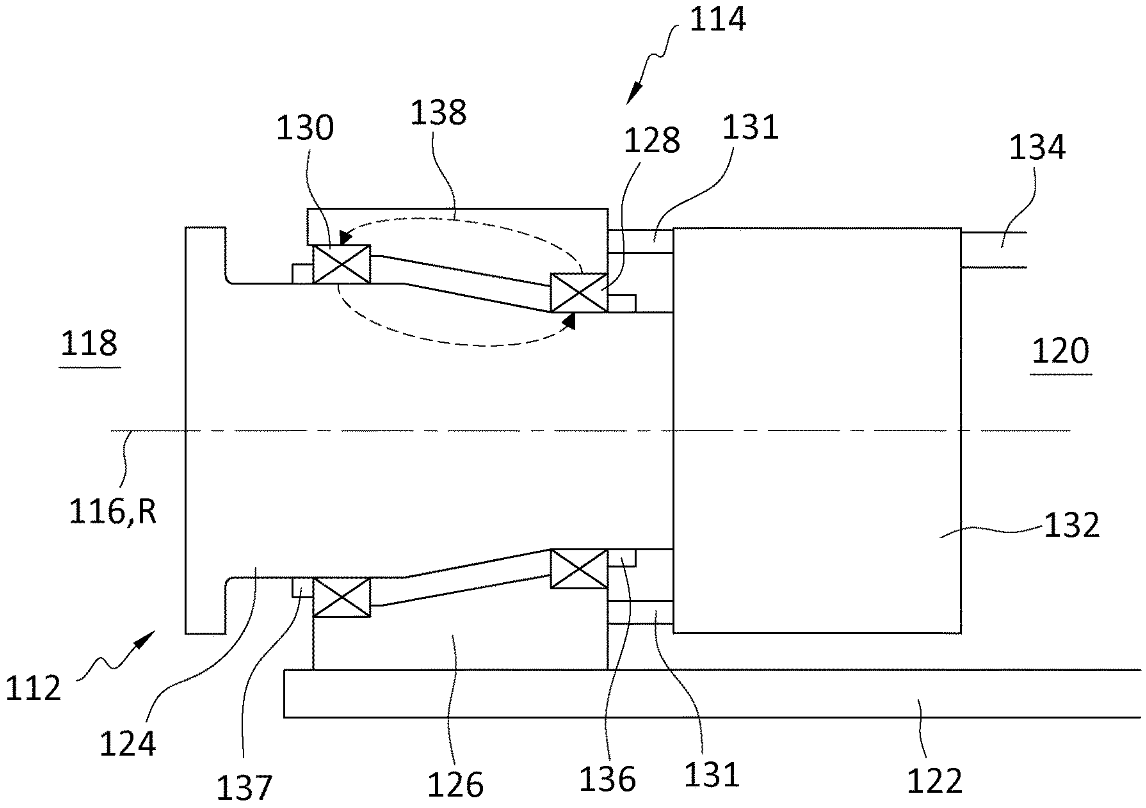
FIG. 2 (Prior Art)
FIG. 2 shows a simplified, partial illustration of a bearing arrangement in a final mounted position with a gearbox connected between the bearing arrangement and a generator according to the prior art.

FIG. 2 shows a simplified representation of an embodiment of a bearing arrangement 114 within wind turbine 100. The bearing arrangement 114 extends in the longitudinal direction 116 along an axis of rotation R from a front rotor side 118 to a rear side 120 (gearbox/generator side). The bearing arrangement 114 generally has a rotor shaft 124 connected to the rotor hub 112 (not illustrated) at the front rotor side 118 of the bearing arrangement 114. Furthermore, the bearing arrangement 114 generally has a bearing housing 126 connected to a machine frame 122. The rotor shaft 124 and the bearing housing 126 are rotatably mounted on one another via two bearings, namely a gearbox-side bearing 128 (first bearing) and a rotor-side bearing 130 (second bearing). Typically, the two bearings are tapered roller bearings. In the shown embodiment, the machine frame 122 supports the whole bearing housing 126, which can be different in other solutions.

In general, the rotor shaft 124 rotates in operation about the axis of rotation R, whereas the bearing housing 126 is fixedly connected to the machine frame 122. In the shown embodiment according to FIG. 2 the rotor shaft 124 is connected to a gearbox 132, in particular to a gearbox input shaft (not shown). The bearing housing 126 is connected to the gearbox 132, in particular to a housing of the gearbox 132, via a torque support arrangement 131. The presence of the torque support arrangement between the bearing housing 126 and the gearbox 132 renders an access to the bearing arrangement from the gearbox side difficult or impossible. The gearbox 132 is connected to a generator (not shown) via an output shaft 134 of the gearbox 132.

In an alternative non-illustrated embodiment, the bearing housing 126 is connected to a gearbox-generator assembly via a torque support arrangement. The gearbox-generator assembly corresponds in particular to a gearbox in which a generator is integrated. In a further non-illustrated embodiment, the wind turbine 100 does not include any gearbox (direct drive concept), such that the bearing housing 126 is connected to a generator via a torque support arrangement.

Referring again to the embodiment of FIG. 2, at the first bearing 128 at the tapered end of the rotor shaft 124, a pretensioning member configured as a pretension ring 136 is arranged which acts on the respective first bearing 128 in the longitudinal direction 116 with a biasing force, so that the entire bearing arrangement 114 is biased and thus no clearance is provided in both the axial direction and in the radial direction with respect to the axis of rotation R. The pretensioning member may alternatively be configured for example, as a shaft nut. The pretensioning force generated by the pretension ring 136 is transmitted via the respective first bearing 128 on the bearing housing 126, from there via the opposite second bearing 130 on the rotor shaft 124. The rotor shaft 124 typically includes a shoulder 137 which serves as an axial abutment for the second bearing 130 on the front rotor side 118. The pretensioning force is then transmitted from the rotor shaft 124 back to the first bearing 128. A pretension circuit 138 is formed by these components, which is exemplified by the dotted lines in FIG. 2.

The bearing arrangement 114 including rotor shaft 124, bearing housing 126, bearings 128, 130 and pretension ring 136 is typically a preassembled unit, which is typically supplied in the assembled state to the site of the wind turbine and is finally mounted there with the rotor hub 112 and the machine frame 122. Alternately, at least part of the components of the bearing arrangement 114 may be separately supplied to the site of the wind turbine and assembled to the remaining components of the bearing arrangement 114 on site.

Following the above, FIG. 2 illustrates the issue of accessibility to the inner ring of bearing 128.

In the following, embodiments of the disclosure are described which focus on an improvement of the pretensioning mechanism.

Figure 3:
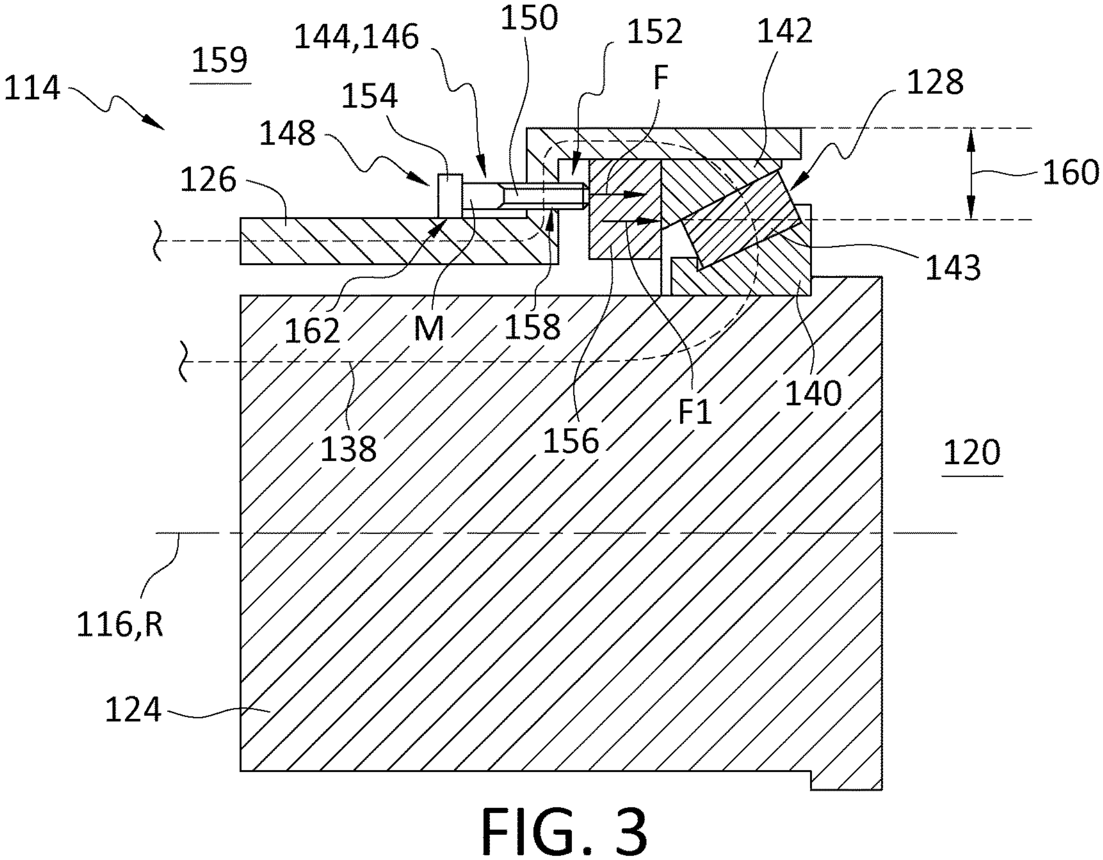
FIGS. 3 to 10 show schematic sectional views of bearing arrangements according to embodiments of the disclosure; and, FIG. 11 shows a schematic sectional view of a bearing arrangement according to an embodiment of the disclosure.

FIG. 3 shows a schematic bearing arrangement 114 according to an embodiment of the disclosure. The bearing arrangement 114 is generally of the type as described with reference to FIG. 2 above. The bearing arrangement 114 has a bearing housing 126, a rotor shaft 124 (corresponding to a rotating component), a first roller bearing 128 and a second roller bearing (not shown for the sake of overview). The bearing arrangement 114 has a longitudinal axis 116 and the rotor shaft 124 rotates around a rotational axis R. The bearing housing 126 supports the first and the second roller bearings 128 and 130. The first and the second roller bearings 128 and 130 support the rotor shaft 124. The first roller bearing 128 and the second roller bearing are tapered roller bearings and arranged in the so-called "O"-arrangement. The first roller bearing 128 is arranged at the rear side 120 (generator side or gearbox side). At the rear side, the rotor shaft 124 is connected to a gearbox (not shown). The first roller bearing 128 includes a first bearing inner ring 140, a first bearing outer ring 142 and rolling elements 143 arranged and supported between the first bearing inner ring 140 and the first bearing outer ring 142.

In an installed state within a wind turbine 100, the bearing arrangement is operated such that a rotation of the rotor 108 drives the rotor shaft 124. The rotation of the rotor shaft 124 is transferred to the gearbox, via which a generator is driven to generate electrical energy.

The bearing arrangement 114 of FIG. 3 is generally pretensioned as described above and in accordance with FIG. 2. In this regard, the first roller bearing 128, the second roller bearing 130, the rotor shaft 124 and the bearing housing 126 are configured and arranged to form a pretension circuit 138.

In order to set/adjust the pretension of the bearing arrangement 114, that is, to adjust the pretension of the formed pretension circuit 138, the first bearing outer ring 142 can be axially moved by an adjustment device 144, that is, in a direction parallel to the rotational axis R. In the shown embodiment, the adjustment device 144 is a screw 146 (also called "pressure screw"). The screw 146 has a first end 148, an at least partially threaded screw shaft 150 and—opposite to the first end 148—a second end 152. At the first end 148, the screw 146 includes a screw head 154. The screw 146 is screwed into a corresponding through-hole 158 of the bearing housing 126 and is arranged such that it can be moved along a moving direction M, wherein the moving direction runs parallel to the rotational axis R, that is, at an angle of 0° with respect to the rotational axis R.

A force transfer element 156 is arranged between the screw 146 and the first bearing outer ring 142. The force transfer element 156 is a ring member extending circumferentially around the rotational axis R. For example, the force transfer element 156 is washer-like and can also be called a pressure ring. The force transfer element 156 is axially moveable.

In the pretensioned state as shown, the adjustment device 144 (screw 146) is in direct contact with the force transfer element 156, wherein the latter is in direct contact with the first bearing outer ring 142.

To adjust the pretension of the bearing arrangement 114, the screw 146 is actuated, that is, torque is applied to the screw 146. To increase the pretension, the screw 146 is actuated (turned) such that it is moved (further) against the force transfer element 156 (towards the right in FIG. 3). Thus, a force F of the screw 146 is increased and this force F is transferred to the force transfer element 156. The force transfer element 156 is configured to distribute the load evenly on the first bearing outer ring 142, such that a resulting force F1 acts on the first bearing outer ring 142. This causes an axial movement/displacement of the first bearing outer ring 142 and thus impacts the pretension circuit 138. The pretension of the bearing arrangement 114 is thus adjusted.

Similarly, the screw 146 can be actuated such that it is moved away from the first bearing outer ring 142 and the force transfer element 156, meaning that the pretension can be reduced.

As can be seen from FIG. 3, the screw 146 is arranged between the first roller bearing 128 and the second roller bearing. Thus, the screw 146 is easily accessible from outside 159 of the bearing arrangement 114. For adjustment of the pretension it is thus not necessary to gain access from the rear (gearbox) side 120, which is particularly problematic after the bearing arrangement 114 has been installed in the wind turbine 100 and/or during operation of the wind turbine 100.

In the shown embodiment, the bearing housing 126 includes a step 160 so that the screw 146 can be accommodated. Of course, other configurations of the bearing housing 126 are applicable. Further, the screw 146 is arranged such that only a small amount of clearance 162 is provided between the screw head 154 and the outer side of the bearing housing 126 in radial direction with respect to the rotational axis R. This means that only a small amount of installation space is required. Different arrangements and configurations are also possible here.

Further, a very precise adjustment of the pretension is possible by the thread of the screw 146. Preferably, a fine thread is used to allow fine tuning of the pretension, that is, only fractions of a mm.

FIGS. 4 to 10 show further embodiments of the disclosure, which slightly differ regarding the adjustment device 144 and the adjustment of the pretension. Thus, the above description of the features similarly applies, unless otherwise stated below. For the sake of clarity, however, not all reference signs are necessarily reproduced in the figures and described again.

Figure 4:
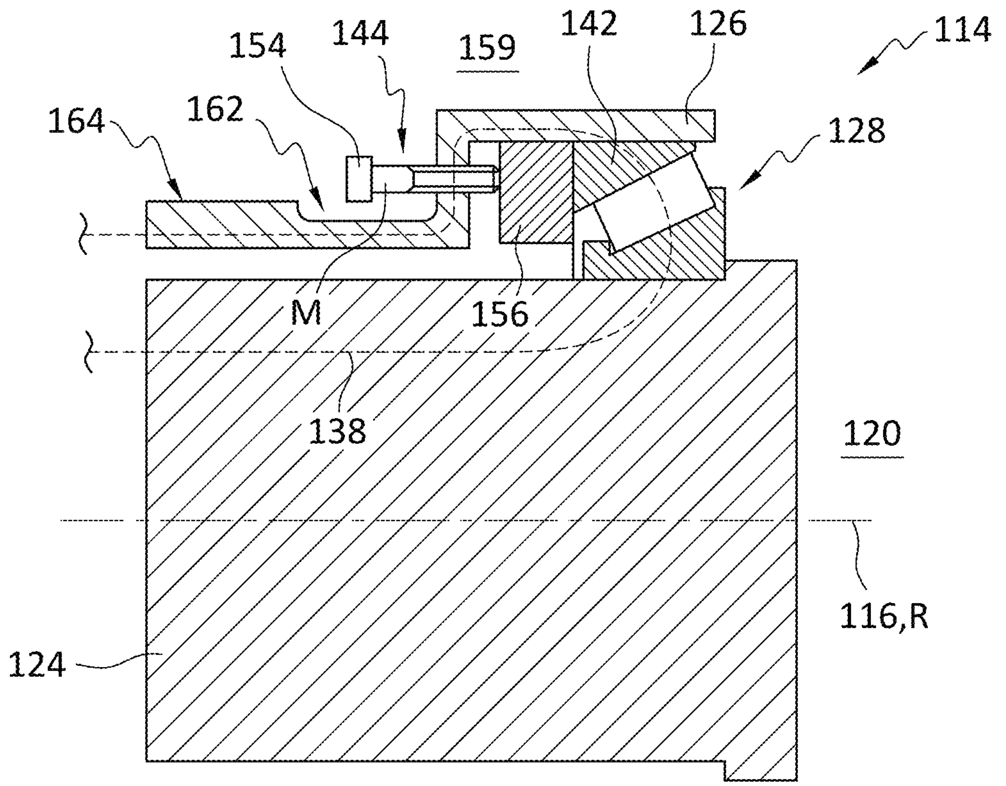

With regard to FIG. 4, a recess 162 is provided on an outer side 164 at the outside 159 of the bearing housing 126. The recess 162 is formed as a deepening. Thus, compared to the embodiment of FIG. 3, a larger clearance or space is provided for the screw 146, in particular the screw head 154. This enables very good access to the screw 146, in particular for a tool to actuate the screw 146. By this embodiment, the step 160 in radial direction (see FIG. 3) could be reduced.

Figure 5:
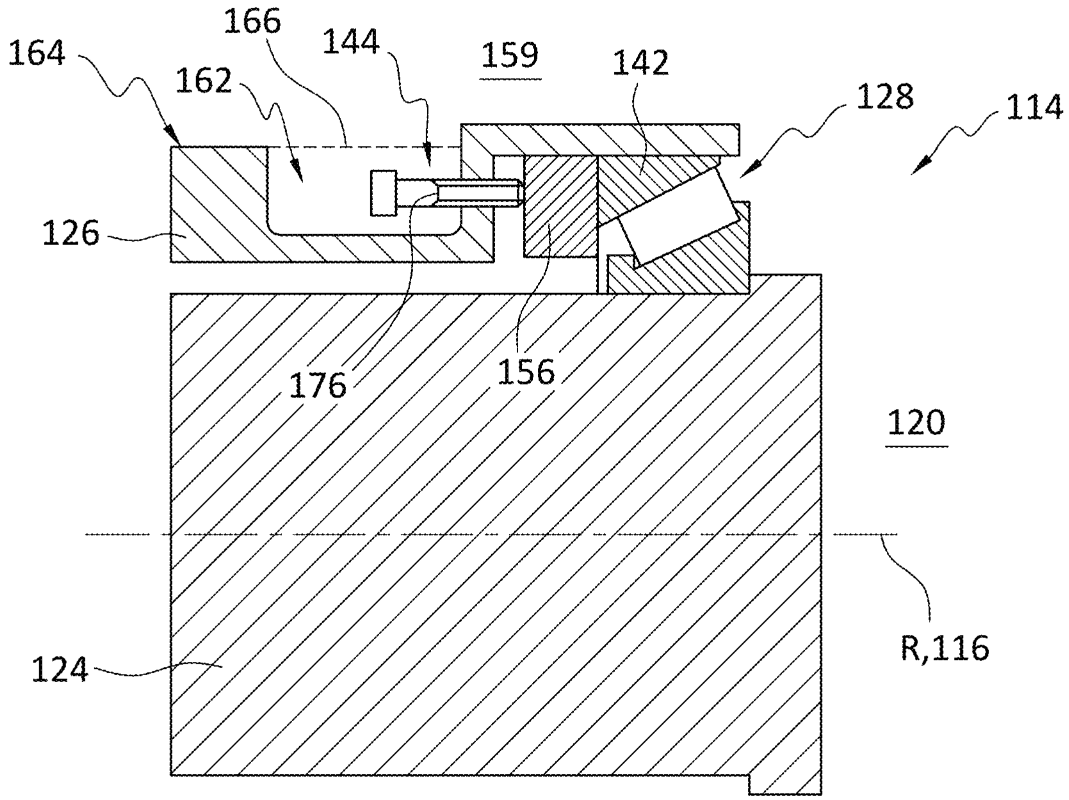

The embodiment of FIG. 5 resembles the embodiment according to FIG. 4, except that the recess 162 is enlarged. The recess 162 is configured such that the screw 146 is embedded in the bearing housing 126 at the outside 159 of the bearing arrangement 114. In other words, the screw 146, and particularly its screw head 154, does not protrude out of the bearing housing 126 in the radial direction. Thus, very easy access to the screw 146 is achieved.

Optionally, the recess 162 has a shape which is adapted to the contour of the screw 146 such that the screw is embedded in the recess 162 with very little clearance, at least in circumferential direction. Thus, edges 166 of the recess on both sides of the screw 146 (indicated in FIG. 5 by the dotted line) serve as geometric limitations to a tool when actuating the screw 146, for example, a turn angle is limited. In other words, the edges 166 serve as an abutment.

Optionally, regarding the embodiments of FIGS. 4 and 5, to ensure a needed stiffness of the bearing housing 126, ribs or similar elements can be provided in the region(s) of the recess 162.

Figure 6:
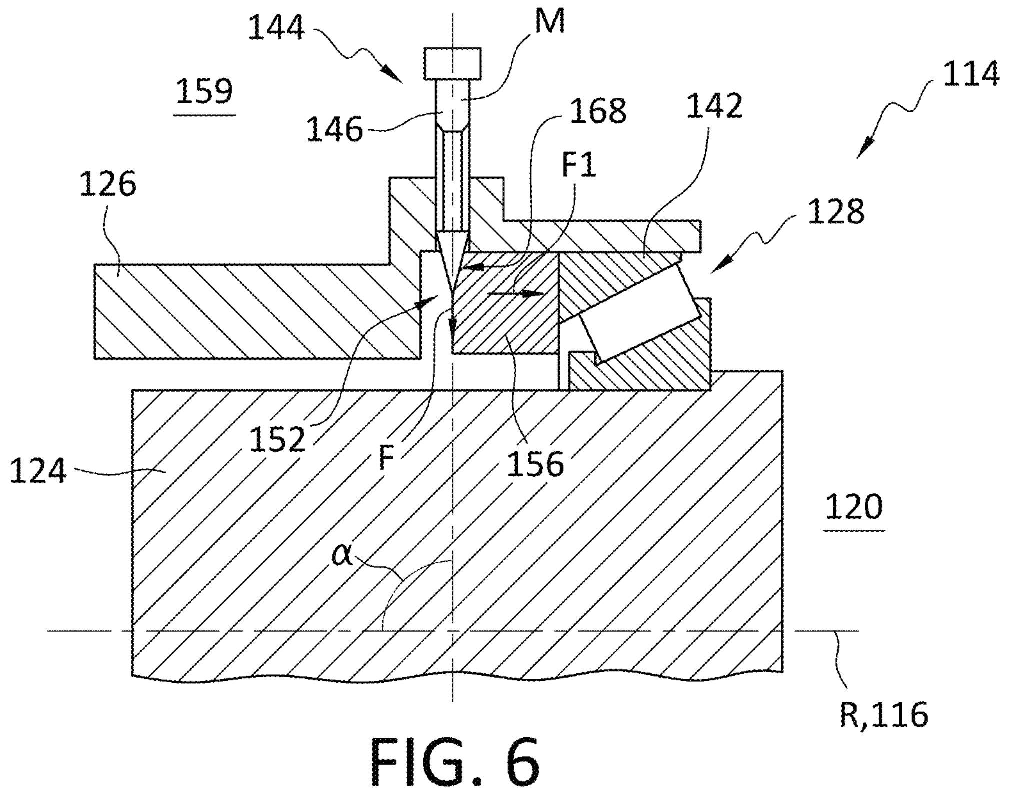

FIG. 6 shows another embodiment of the disclosure, which differs in that the adjustment device 144 (screw 146) is arranged at an angle α, here 90°, with respect to the rotational axis R. In other words, the moving direction of the screw 146 is arranged at 90° with respect to the rotational axis R. Since the force transfer element 156 is moveable parallel to the rotational axis R, the force F generated by actuating the screw 146 needs to be redirected. For this purpose, the second end 152 of the screw 146 and the corresponding side of the force transfer element 156 are configured to form an inclined contact surface 168. In other words, the contact surface 168 runs inclined with respect to the moving direction M. For example, the tip of the screw 146 is inclined or wedged. Thus, by actuating the adjustment device 144, that is, by moving it in radial direction, the force F of the screw 146 is redirected such that the force transfer element 156 axially transfers a resulting force F1 onto the first bearing outer ring 142 in order to move/displace the first bearing outer ring 142 and thus pretension the bearing arrangement 114 as already described.

The embodiment of FIG. 6 enables much finer adjustments of the pretension to be possible due to a cone/wedge angle. For example, no step in the bearing housing 126 is necessary so that there is no negative impact on the structural integrity or configuration of the bearing housing 126.

Figure 7:
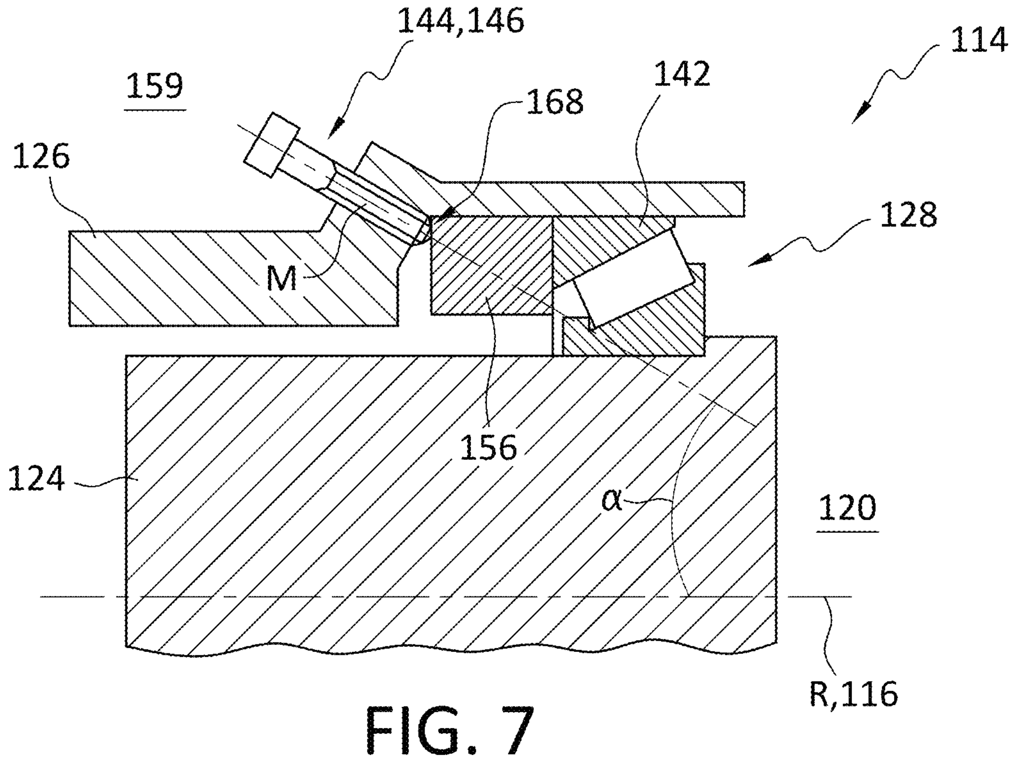

The embodiment of FIG. 7 is similar to the embodiment according to FIG. 6, wherein the angle α is different. In the shown embodiment, the angle α is 45° for example. Again, the inclined contact surface 168 runs at an angle with respect to the moving direction M.

By this inclined, for example, diagonally orientated, screw 146 an optimized configuration is established, depending on the available space and the necessary tensioning ratio. Furthermore, the inclination of the screw 146 enables a configuration which is adapted to an existing bearing housing geometry.

As a side note here, every angle between 0° and 90° with respect to the rotational axis R is possible.

Figure 8:
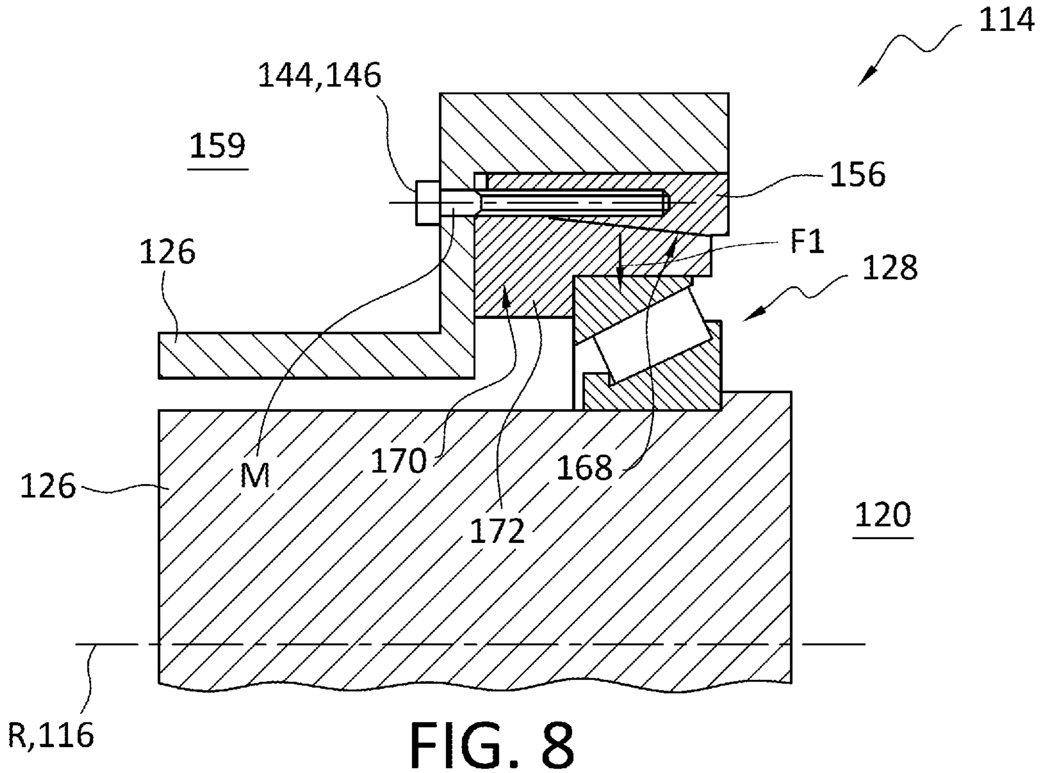

The embodiment according to FIG. 8 differs from the above described embodiments with regard to the force transfer element 156 and the kind of pretension force generated. In the shown embodiment, a further force transfer element 170 is provided. Both the force transfer element 156 and the further force transfer element 170 are arranged in direct contact, wherein the force transfer element 156 is arranged radially outwards compared to the further force transfer element 170. Both force transfer elements 156 and 170 are arranged surrounding around the first bearing outer ring 142 in radial direction. Both force transfer elements 156 and 170 are in form-fit contact via an inclined contact surface 168. In other words, the force transfer elements 156 and 170 contact each other in a wedge-shaped manner. Further, the screw 146 is not screwed into the bearing housing 126 (as it is in the above-described embodiments), but is screwed into the force transfer element 156. In the present embodiment, by actuating the screw 146 along the moving direction M, which is parallel to the rotational axis R, the generated force is redirected via the force transfer elements 156 and 170 to radially act on the first bearing outer ring 142 and thus deform the first bearing outer ring 142 in a radial direction with respect to the rotational axis R. The pretension of the bearing arrangement 114 is thus adjusted. Thereby the first bearing outer ring 142 is deformed in a radial direction with respect to the rotational axis R.

It is noted that the further force transfer element 170 includes an inner shoulder (also named step or ring section) to fix the first bearing outer ring 142 in axial direction.

The embodiment thus provides for an adjustment of pretension by radially compressing the further force transfer element, and thus the first bearing outer ring 142. The axial position of the first bearing outer ring 142 is preferably stationarily fixed. A fine tuning of pretension is provided by the wedged contact surface 168.

Optionally, the force transfer elements 156 and 170 could be formed in segments, as one-piece rings of large diameter may lead to undesired deformations due to their own weight. Furthermore, the segmenting of the force transfer elements 156 and 170 could provide a better handling. The segments could be spaced from one another. The gap width between two neighboring segments would then be dependent on the deformation of the segments in circumferential direction. Alternatively, the segments could be connected to one another via flexible connectors.

Figure 9:
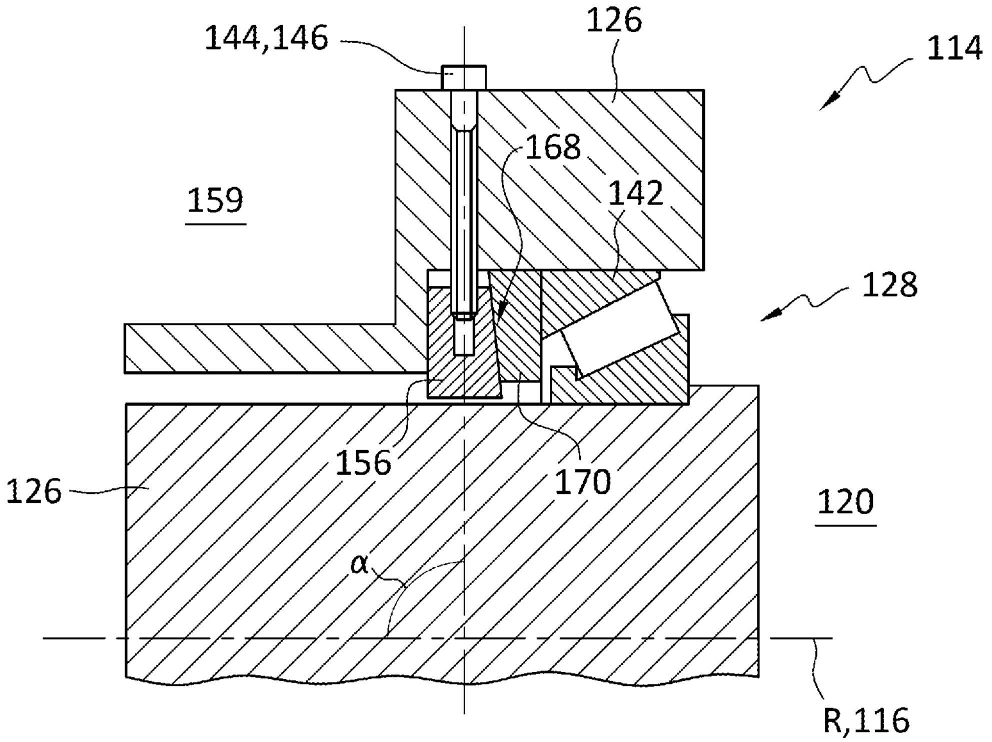

The embodiment according to FIG. 9 is similar to the embodiment of FIG. 8. However, both force transfer elements 156 and 170 are arranged axially next to the first bearing 128 with respect to the longitudinal direction 116. The screw 146 is screwed into the force transfer element 156, which is arranged furthest away from the first roller bearing 128. Further, the screw 146 is arranged to have a moving direction M in an angle α of 90° with respect to the rotational axis R. By turning the screw 146, the generated force acts on the force transfer element 156, wherein a force transfer to the further force transfer element 170 occurs via the inclined contact surface 168 to act in axial direction on the first bearing outer ring 142, as described above.

Such an embodiment provides almost no restrictions for the bearing housing 126. Optionally, the force transfer element 156 could include openings or recesses distributed along its circumference. This would enhance the deformation of the force transfer element 156 upon turning the screw 146.

Figure 10:
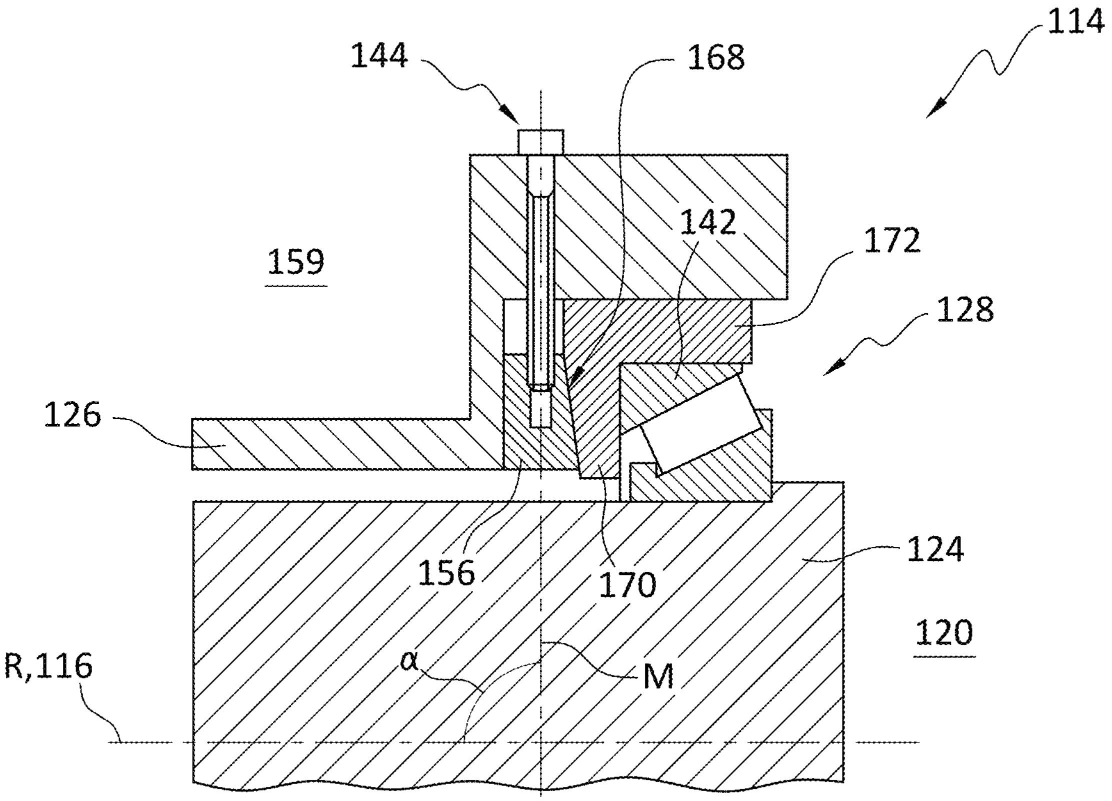

Finally, the embodiment according to FIG. 10 is similar to the embodiment of FIG. 9, wherein the further force transfer element 170 provides a bearing seat 172 for the first bearing outer ring 142.

With regard to the embodiments according to FIGS. 9 and 10, the force transfer elements 156 and 170 can be made of a proper material, for example, bronze, to ideally slide on each other via the inclined surface 168.

Figure 11:
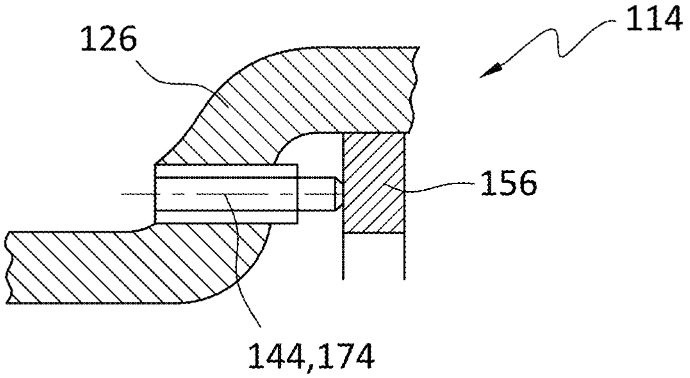

Instead of a normal screw 146 as used in the above-described embodiments, alternatively the adjustment device 144 is a grub screw 174, as exemplarily shown in FIG. 11 which details only a portion of the bearing arrangement 114. For example, the grub screw 174 may have an external hexagon for a tool to be actuated. An advantage of the grub screw 174 is that it has no screw head. This means that less space is required for access to the grub screw 174 from outside 159 of the bearing housing 126.

Generally, for an adjustment device 144 that is a screw or a grub screw, fine threads are preferred in order to fine-tune the movement of the screw and thus the pretension.

As a further alternative to the embodiments described above, the adjustment device 144 can be a hydraulic device, in particular a hydraulic cylinder including a cylinder barrel and a hydraulic piston which is moved within the cylinder barrel. The hydraulic piston is moved in the moving direction M by hydraulic force. The hydraulic cylinder can for example be provided (at least partially) in the bearing housing 126.

Optionally, in the embodiments as described above, a further adjustment device, for example, a screw, grub screw, nut, pretension ring, hydraulic device, can be provided in addition to the adjustment device 144. The further adjustment device is provided to act on the first bearing inner ring 140 as described above (see for example the pretension ring 136 according to FIG. 2).

Optionally, the described adjustment device 144 in any of the above embodiments includes a sensor 176, as exemplarily indicated in FIG. 5. The sensor 176 is, for example, a strain gauge and configured to measure a parameter representative for a pretensioning state of the bearing arrangement. Based on the sensor's measurement, the pretension of the bearing arrangement 114 is adjusted as described above.

Although reference is made to only one adjustment device 144 in each of the previously described embodiments of the disclosure, a plurality of adjustment devices 144 can be provided in each of the above-described bearing arrangements 114, as described in the introductory section. Thus, a good, in particular even, load distribution can be applied to the first bearing outer ring 142, for example via the force transfer element 156.

It should be mentioned that the described embodiments are not restricted to special details of the bearings and/or the bearing arrangement, for example concerning the configuration of the shaft 124 or the configuration of the bearing housing 126. The provision of one or more adjustment devices 144 which allow for easy adjustment of the bearing pretension from outside the bearing housing is essential, even after an initial installation in the wind turbine or during operation of the wind turbine.

It is understood that the foregoing description is that of the preferred embodiments of the invention and that various changes and modifications may be made thereto without departing from the spirit and scope of the invention as defined in the appended claims.

REFERENCE SIGNS

100 wind turbine
102 tower
104 foundation
106 nacelle
108 rotor
110 rotor blade
112 rotor hub
114 bearing arrangement
116 longitudinal direction
118 front rotor side
120 rear side
122 machine frame
124 rotor shaft
126 bearing housing
128 first bearing
130 second bearing
131 torque support arrangement
132 gearbox
134 output shaft
136 pretension ring
137 shoulder
138 pretension circuit
140 first bearing inner ring
142 first bearing outer ring
143 rolling element
144 adjustment device
146 screw
148 first end
150 screw shaft
152 second end
154 screw head
156 force transfer element
158 through-hole
159 outside
160 step
162 clearance/recess
164 outer side
166 edge
168 contact surface
170 further force transfer element
172 bearing seat
174 grub screw
176 sensor
F force
F1 resulting force
M moving direction
R rotational axis
α angle

The invention claimed is:

1. A bearing arrangement for a rotating component of a wind turbine, the bearing arrangement comprising:

a first roller bearing and a second roller bearing;

said rotating component defining a rotational axis and being supported by said first roller bearing and said second roller bearing;

a bearing housing defining a through-hole and supporting said first roller bearing and said second roller bearing;

said first roller bearing, said second roller bearing, said rotating component and said bearing housing being arranged to form a pretension circuit;

said first roller bearing including a first bearing inner ring, a first bearing outer ring and rolling elements arranged between said first bearing inner ring and said first bearing outer ring;

said second roller bearing including a second bearing inner ring, a second bearing outer ring, and rolling elements arranged between said second bearing inner ring and said second bearing outer ring;

said first roller bearing and said second roller bearing are distant from one another in the axial direction along the rotational axis;

said first bearing outer ring being axially moveable along said rotational axis with respect to said bearing housing and/or radially deformable with respect to said rotational axis;

an adjustment device extending through said through-hole of said bearing housing;

said adjustment device being accessible from outside said bearing housing; and, said adjustment device, upon actuation, being configured to cause at least one of the following:

i) an axial movement of said first bearing outer ring; and, ii) a radial deformation of said first bearing outer ring to adjust a pretension of said bearing arrangement.

2. The bearing arrangement of claim 1, wherein said adjustment device is located between said first roller bearing and said second roller bearing.

3. The bearing arrangement of claim 1, wherein said adjustment device is configured to move at an angle (α) in accordance with one of the following:

i) from 0° to 135° with respect to said rotational axis;

ii) from 0° to 90° with respect to said rotational axis; and, iii) of 0° or 90° with respect to said rotational axis.

4. A bearing arrangement for a rotating component of a wind turbine, the bearing arrangement comprising:

a first roller bearing and a second roller bearing;

said rotating component defining a rotational axis and being supported by said first roller bearing and said second roller bearing;

a bearing housing defining a through-hole and supporting said first roller bearing and said second roller bearing;

said first roller bearing, said second roller bearing, said rotating component and said bearing housing being arranged to form a pretension circuit;

said first roller bearing including a first bearing inner ring, a first bearing outer ring and rolling elements arranged between said first bearing inner ring and said first bearing outer ring;

said first bearing outer ring being axially moveable along said rotational axis with respect to said bearing housing and/or radially deformable with respect to said rotational axis;

an adjustment device extending through said through-hole of said bearing housing;

said adjustment device being accessible from outside said bearing housing;

said adjustment device, upon actuation, being configured to cause at least one of the following:

i) an axial movement of said first bearing outer ring; and, ii) a radial deformation of said first bearing outer ring to adjust a pretension of said bearing arrangement; and, wherein said adjustment device is located between said first roller bearing and said second roller bearing.

5. The bearing arrangement of claim 4, further comprising a force transfer element between said adjustment device and said first bearing outer ring so as to cause a force generated by actuation of said adjustment device to be transferred to said first bearing outer ring.

6. The bearing arrangement of claim 5, wherein said adjustment device is configured to move along a predefined moving direction, wherein said adjustment device and said force transfer element conjointly include a contact interface inclined with respect to said predefined moving direction.

7. The bearing arrangement of claim 5, wherein said adjustment device is configured to move along a predefined moving direction; a further force transfer element is provided between said force transfer element and said first bearing outer ring; and, said force transfer element and said further force transfer element conjointly form a contact interface inclined with respect to said predefined moving direction.

8. The bearing arrangement of claim 7, wherein said force transfer element and/or said further force transfer element is a ring-shaped element surrounding said rotational axis.

9. The bearing arrangement of claim 8, wherein said ring-shaped element is a pressure ring or washer.

10. The bearing arrangement of claim 8, wherein said force transfer element and/or said further force transfer element is formed in segments.

11. The bearing arrangement of claim 4, further comprising a second adjustment device, wherein, upon actuation, said second adjustment device is configured to cause an axial movement and/or a radial deformation of said first bearing inner ring to adjust the pretension of said bearing arrangement.

12. The bearing arrangement of claim 4, wherein said adjustment device is a screw, a bolt or a hydraulic cylinder.

13. The bearing arrangement of claim 4, wherein:
said bearing housing has an outer surface and has a recess formed in said outer surface; and,
said adjustment device is at least partially arranged in said recess for mounting and/or actuating said adjustment device.

14. The bearing arrangement of claim 13, wherein said adjustment device is a screw; and, said recess has a shape which is adapted to a contour of said adjustment screw so as to permit said adjustment screw to be embedded in said recess such that turning said adjustment screw is geometrically limited.

15. The bearing arrangement of claim 4, wherein said adjustment device is a screw; and, said bearing arrangement further comprises an abutment element at said bearing housing in a region of said adjustment screw or at said adjustment screw, so that turning of said adjustment screw is geometrically limited.

16. The bearing arrangement of claim 4, wherein said adjustment device comprises a sensor for measuring a parameter representative for the pretensioning state of said bearing arrangement.

17. The bearing arrangement of claim 16, wherein said sensor is configured as a strain gauge.

18. The bearing arrangement of claim 4, wherein a plurality of adjustment devices are provided such that said plurality of adjustment devices are circumferentially spaced about the circumference of said first outer bearing ring.

19. The bearing arrangement of claim 4, wherein said bearing arrangement is a rotor bearing arrangement.

20. The bearing arrangement of claim 4, wherein said adjustment device is configured to move at an angle ($\alpha$) in accordance with one of the following:
i) from 0° to 135° with respect to said rotational axis;
ii) from 0° to 90° with respect to said rotational axis; and,
iii) of 0° or 90° with respect to said rotational axis.

* * * * *